United States Patent
Jang et al.

(10) Patent No.: US 12,495,220 B2
(45) Date of Patent: Dec. 9, 2025

(54) MEMORY DEVICE, OPERATING METHOD OF MEMORY DEVICE AND MEMORY SYSTEM INCLUDING PHASE DIFFERENCE CORRECTION BASED ON A POSITION OF A PIXEL

(71) Applicant: Samsung Electronics Co., Ltd., Suwon-si (KR)

(72) Inventors: Chanyoung Jang, Suwon-si (KR); Hee Kang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 391 days.

(21) Appl. No.: 18/158,180

(22) Filed: Jan. 23, 2023

(65) Prior Publication Data
US 2023/0247318 A1    Aug. 3, 2023

(30) Foreign Application Priority Data
Jan. 28, 2022   (KR) ................. 10-2022-0013623
May 11, 2022    (KR) ................. 10-2022-0058029

(51) Int. Cl.
*H04N 25/61* (2023.01)
*H04N 23/84* (2023.01)
*H04N 25/13* (2023.01)
*H10F 39/00* (2025.01)
*H10F 39/18* (2025.01)

(52) U.S. Cl.
CPC ............ *H04N 25/61* (2023.01); *H04N 23/84* (2023.01); *H04N 25/134* (2023.01); *H04N 25/135* (2023.01); *H10F 39/8063* (2025.01); *H10F 39/182* (2025.01)

(58) Field of Classification Search
CPC ...... H04N 25/61; H04N 23/84; H04N 25/134; H04N 25/135; H04N 25/133; H04N 25/704; H01L 27/14627; H01L 27/14645
USPC .......................................................... 348/241
See application file for complete search history.

(56) References Cited

U.S. PATENT DOCUMENTS

| | | |
|---|---|---|
| 8,593,547 B2 | 11/2013 | Ueda |
| 10,015,472 B2 | 7/2018 | Hayasaka et al. |
| 10,552,972 B2 | 2/2020 | Ahn et al. |
| 11,044,407 B2 | 6/2021 | Jeong et al. |
| 2012/0025060 A1* | 2/2012 | Iwata ............... H04N 25/79 257/E31.127 |

(Continued)

FOREIGN PATENT DOCUMENTS

| | | |
|---|---|---|
| JP | 2004-128653 A | 4/2004 |
| JP | 2014-026050 A | 2/2014 |

OTHER PUBLICATIONS

Kobayashi Masahiro, et al., "A low noise and high sensitivity image sensor with imaging and phase-difference detection AF in all pixels.", ITE Transactions on Media Technology and Applications, 4.2, 2016, pp. 123-128.

*Primary Examiner* — Usman A Khan
(74) *Attorney, Agent, or Firm* — HARNESS, DICKEY & PIERCE, P.L.C.

(57) ABSTRACT

An image processing method of processing image data generated by an image sensor, the image sensor including a pixel array, includes calculating position information according to pixel positions in the image data, the pixel positions corresponding to pixels of the pixel array, and correcting a phase difference of the image data based on the position information.

18 Claims, 14 Drawing Sheets

(56) References Cited

U.S. PATENT DOCUMENTS

| | | | |
|---|---|---|---|
| 2015/0002713 A1* | 1/2015 | Nomura | H10F 39/807 |
| | | | 348/302 |
| 2018/0357750 A1 | 12/2018 | Chen et al. | |
| 2019/0139189 A1* | 5/2019 | Srinivasamurthy | G06T 3/4007 |
| 2019/0296062 A1* | 9/2019 | Terauchi | G06F 9/30003 |
| 2020/0260029 A1* | 8/2020 | Kang | H04N 17/002 |
| 2020/0358998 A1 | 11/2020 | Fukuda | |

* cited by examiner

MEMORY DEVICE, OPERATING METHOD OF MEMORY DEVICE AND MEMORY SYSTEM INCLUDING PHASE DIFFERENCE CORRECTION BASED ON A POSITION OF A PIXEL

CROSS-REFERENCE TO RELATED APPLICATIONS

This application is based on and claims priority under 35 U.S.C. § 119 to Korean Patent Application No. 10-2022-0013623, filed on Jan. 28, 2022 in the Korean Intellectual Property Office, and Korean Patent Application No. 10-2022-0058029, filed on May 11, 2022 in the Korean Intellectual Property Office, the disclosures of each of which are incorporated by reference herein in their entireties.

BACKGROUND

The inventive concepts relate to image sensors, image processing apparatuses, and image processing methods, and more particularly, to image sensors, image processing apparatuses, and image processing methods, for providing a high-quality image based on correcting a phase difference between pixels sharing a microlens.

An imaging device for capturing an image and converting the image into an electrical signal may be used in not only popular consumer electronic devices, such as digital cameras, mobile phone cameras, and portable camcorders, but also cameras mounted in vehicles, security devices, and robots. The imaging device may include a pixel array, and each pixel included in the pixel array may include a photosensitive element. The photosensitive element may generate an electrical signal depending on the intensity of absorbed light.

A structure of a plurality of pixels sharing a microlens to provide an improved auto-focus function may cause quality degradation in pictures, images, and the like due to a deviation between signals respectively detected by the plurality of pixels sharing the microlens.

SUMMARY

Some example embodiments of the inventive concepts provide an image sensor, an image processing apparatus, and an image processing method, for providing a high-quality image.

According to some example embodiments of the inventive concepts, there is provided an image processing method of processing image data generated by an image sensor that includes a pixel array, where the image processing method may include calculating position information according to pixel positions in the image data, the pixel positions corresponding to pixels of the pixel array, and correcting a phase difference of the image data based on the position information.

According to some example embodiments of the inventive concepts, there is provided an image sensor that may include a pixel array including a plurality of pixel groups that each may include a plurality of pixels, and a signal processor. The signal processor may be configured to calculate position information, which is information associated with positions of the pixels in the pixel array, from the image data, generate characteristic information, correct a phase difference of the image data by using the characteristic information and the position information, to generate corrected image data based on the corrected phase difference of the image data.

According to some example embodiments of the inventive concepts, there is provided an image processing apparatus including a signal processor configured to process image data output from an image sensor that includes a pixel array. The image processing apparatus may include a memory storing a program of instructions, and a processor configured to execute the program of instructions to process the image data based on calculating position information from the image data, wherein the position information is information associated with positions of pixels in the pixel array, generating characteristic information associated with the image sensor, and correcting a phase difference of the image data based on using the characteristic information and the position information.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Hereinafter, some example embodiments are described in detail with reference to the accompanying drawings.

As described herein, when an operation is described to be performed "by" performing additional operations, it will be understood that the operation may be performed "based on" the additional operations, which may include performing said additional operations alone or in combination with other further additional operations.

Figure 1:
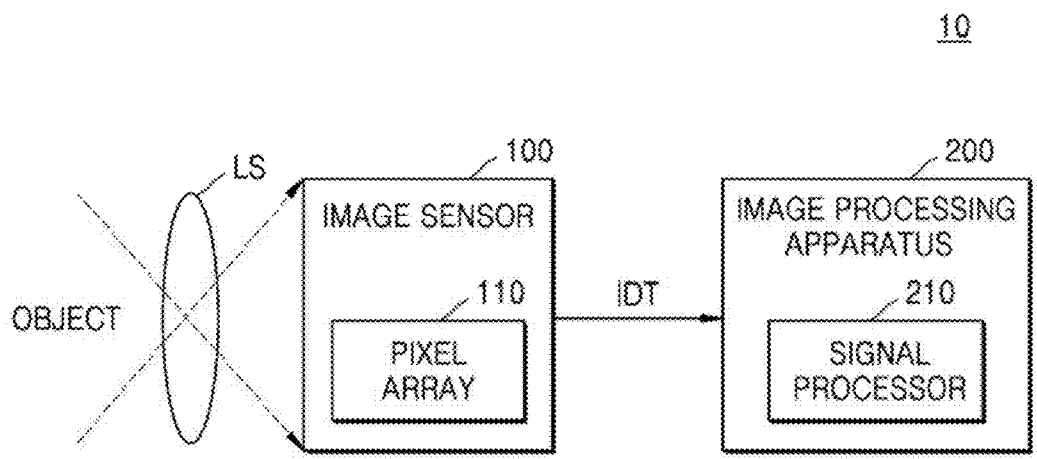
FIG. 1 is a block diagram illustrating an image processing system according to some example embodiments.

FIG. 1 is a block diagram illustrating an image processing system 10 according to some example embodiments.

The image processing system 10 may be implemented by an electronic device for capturing an image and displaying the captured image or performing an operation based on the captured image. The image processing system 10 may be implemented by, for example, a personal computer (PC), an Internet of Things (IoT) device, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, or the like. In some example embodiments, the image processing system 10 may be mounted in an electronic device, such as a drone or an advanced driver assistance system (ADAS), or an electronic device provided as a component in a vehicle, furniture, a manufacturing facility, a door, various kinds of measurement devices, and the like.

Referring to FIG. 1, the image processing system 10 may include an image sensor 100 and an image processing apparatus 200. The image processing system 10 may further include other components, such as a display and a user interface. The image processing apparatus 200 may include a signal processor 210. The image processing apparatus 200 or the image processing system 10 may be implemented by a system on chip (SoC).

The image sensor 100 may convert, into an electrical signal, an optical signal reflected from an object through an optical lens LS, generate image data IDT based on electrical signals, and output (e.g., transmit) the image data IDT. Although FIG. 1 shows that the optical lens LS includes one lens, the inventive concepts are not limited thereto. The optical lens LS may include a plurality of lenses. The image sensor 100 and the optical lens LS may be included in a camera module (e.g., camera, camera device, etc.).

The image sensor 100 may include a pixel array 110 including a plurality of pixels. The pixel array 110 may include a color filter array having a certain pattern and the pixel array 110 may convert an optical signal into an electrical signal by using the color filter array. In some example embodiments, the pixel array 110 may include pixel groups each configured so that four pixels arranged in two adjacent columns and two adjacent rows share one microlens.

The image processing apparatus 200 may perform image signal processing for image quality enhancement, such as noise reduction, gamma correction, color filter array interpolation, color matrix, color correction, and color enhancement, on the image data IDT. In addition, the image processing apparatus 200 may generate an image file by compressing image data generated by the image signal processing for image quality enhancement or restore the image data from the image file.

In some example embodiments, the signal processor 210 in the image processing apparatus 200 may correct a phase difference between pixels sharing a microlens according to a pixel position at which a pixel is located in the pixel array 110. An effective aperture size of the optical lens LS may vary depending on a pixel position at which a pixel is located in the pixel array 110. Therefore, by correcting a phase difference of image data according to a pixel position at which a pixel is located, an image processing operation according to the inventive concepts may remove an artifact pattern caused in an out-focus region due to the effective aperture size of the optical lens LS, thereby providing a high-quality image and thus improving the performance of the image sensor 100, the image processing apparatus 200, and/or the image processing system 10, for example improving the ability thereof to provide higher-quality images based on reducing, minimizing, or removing artifact patterns therein due to correcting phase differences in the image data associated with said images based on position information according to pixel positions corresponding to pixels of the pixel array in the image data.

The signal processor 210 may further perform an operation of transforming a format of the image data IDT to full image data of a red color, a green color, and a blue color, in addition to the image processing operation described above. Besides the above, the signal processor 210 may further perform pre-processing, such as crosstalk correction and despeckle operations, on the image data IDT, and post-processing, such as a sharpening operation, on the full image data. In addition, for example, the signal processor 210 may further perform operations, such as auto dark level compensation (ADLC), bad pixel correction, and lens shading correction, on the image data IDT. However, in some example embodiments, the signal processor 210 may be included not in the image processing apparatus 200 but in the image sensor 100.

Figure 2:
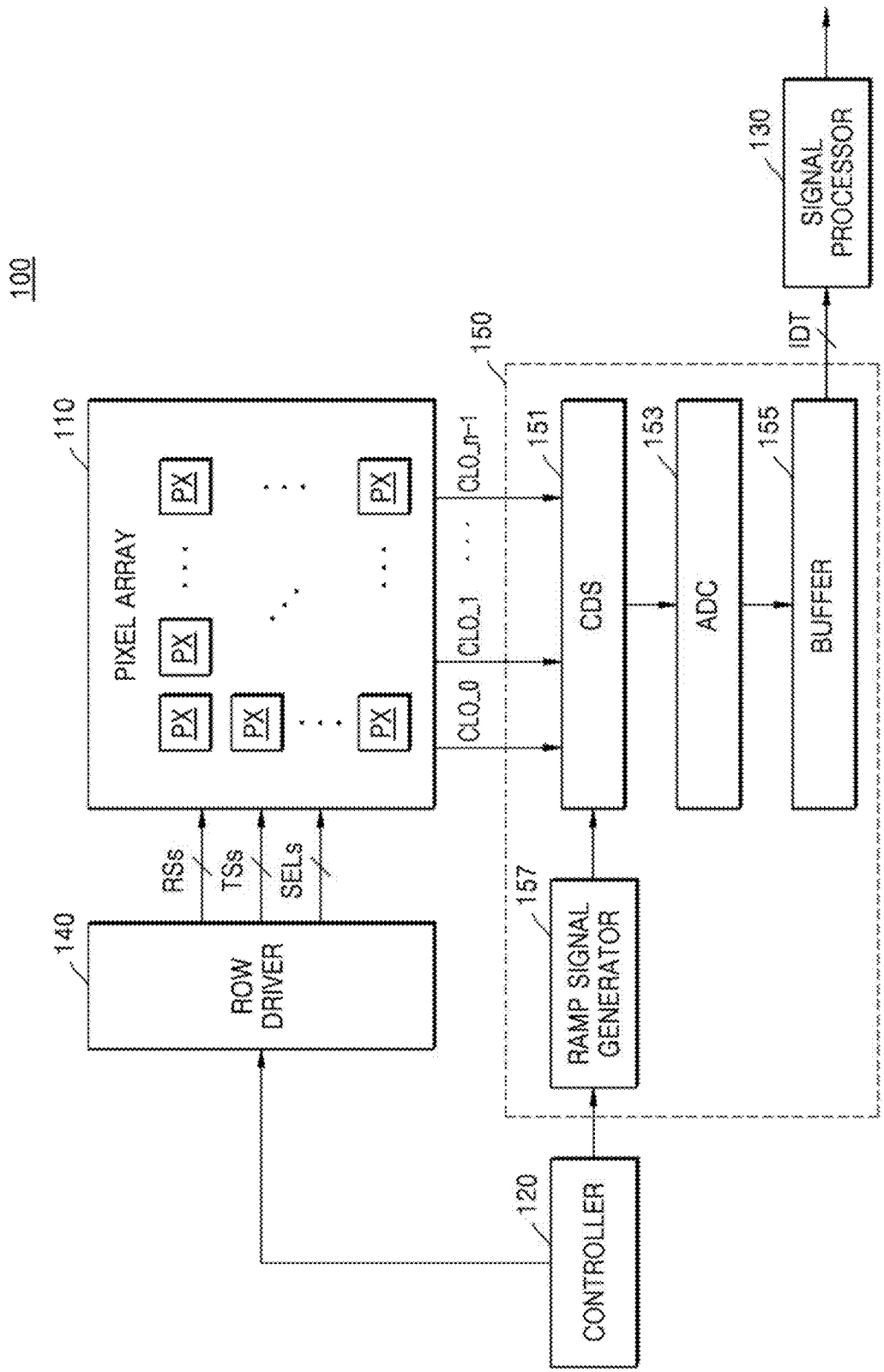
FIG. 2 is a block diagram illustrating an image sensor according to some example embodiments.

FIG. 2 is a block diagram illustrating the image sensor 100 according to some example embodiments.

Referring to FIG. 2, the image sensor 100 may include the pixel array 110, a controller 120, a signal processor 130, a row driver 140, and a signal reader 150. The signal reader 150 may include a correlated-double sampler (CDS) 151, an analog-digital converter (ADC) 153, and a buffer 155.

The pixel array 110 may convert (e.g., photoelectrically convert) an optical signal (e.g., incident light) into an electrical signal and include a plurality of pixels PX, which are two-dimensionally arranged. Each of the plurality of pixels PX may generate a pixel signal according to the intensity of sensed light. A pixel PX may be implemented by a photoelectric conversion element, e.g., a charge coupled device (CCD), a complementary metal oxide semiconductor (CMOS), or the like or implemented by various types of photoelectric conversion elements. The pixel array 110 may include color filters to sense various colors, and the plurality of pixels PX may sense corresponding colors, respectively.

In some example embodiments, the pixel array 110 may include pixel groups each including four pixels arranged in two columns and two rows and sharing one microlens such that the one microlens at least partially overlaps the four pixels of the pixel group. Each of the pixel groups may include its corresponding color filter. A detailed configuration of the pixel array 110 is described below with reference to FIGS. 3 and 4.

Each of the plurality of pixels PX may output (e.g., transmit) a pixel signal to the CDS 151 through a corresponding one of first to nth column output lines CLO_0 to CLO_n−1 (n being any positive integer, for example being any positive integer equal to or greater than 2). The CDS 151 may sample and hold a pixel signal provided (e.g., transmitted) from the pixel array 110. The CDS 151 may dually sample a level (e.g., magnitude) of particular noise and a level (e.g., magnitude) according to a pixel signal and output a level corresponding a difference between the sampled levels. In some example embodiments, the CDS 151 may receive a ramp signal generated by the ramp signal generator 157, compare the ramp signal to the level corresponding to the difference, and output (e.g., transmit) a comparison result.

The ADC 153 may convert, into a digital signal, an analog signal corresponding to a level (e.g., signal magnitude) of a signal received from the CDS 151. The buffer 155 may latch a digital signal, and the latched digital signal may be sequentially output as the image data IDT to the outside of the signal processor 130 or the image sensor 100.

The controller 120 may control the row driver 140 so that the pixel array 110 accumulates charges by absorbing light or temporarily stores the accumulated charges and outputs an electrical signal according to the stored charges to the outside of the pixel array 110. In addition, the controller 120 may control the signal reader 150 to measure a level of a pixel signal provided from the pixel array 110.

The row driver 140 may generate signals, e.g., reset control signals RSs, transmission control signals TSs, and select signals SELs, for controlling the pixel array 110 and provide the same to the plurality of pixels PX. The row driver 140 may determine activation and inactivation timings of the reset control signals RSs, the transmission control signals TSs, and the select signals SELs to be provided to the plurality of pixels PX.

The signal processor 130 may perform signal processing based on pixel signals output from the plurality of pixels PX. For example, the signal processor 130 may perform noise reduction processing, gain adjustment, waveform normalization processing, interpolation processing, white balance processing, gamma processing, edge enhancement processing, and the like.

In some example embodiments, the signal processor 130 may correct a phase difference between pixels PX sharing a microlens according to a pixel position at which a pixel PX is located in the pixel array 110. Therefore, the image sensor 100 may remove an artifact pattern caused in an out-focus region due to an effective aperture size of an optical lens (e.g., LS of FIG. 1), thereby providing a high-quality image and thus improving the performance of the image sensor 100 to provide improved quality images having reduced, minimized, or removed artifact patterns therein. However, in some example embodiments, as described with reference to FIG. 1, the signal processor 130 may be included in a processor (e.g., 200 of FIG. 1) outside the image sensor 100 and thus may be configured to improve the performance of the processor outside the image sensor 100 to provide (e.g., output, transmit, etc.) improved-quality images.

Figure 3:
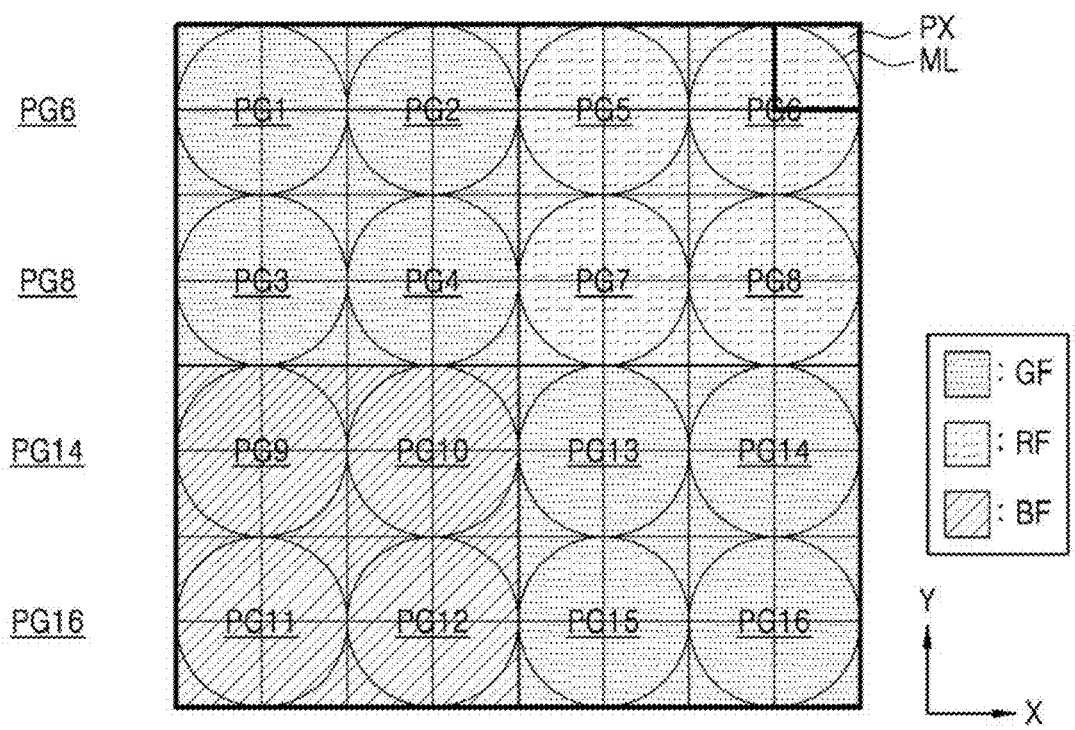
FIGS. 3 and 4 illustrate examples of a pixel array in an image sensor, according to some example embodiments.
Figure 4:
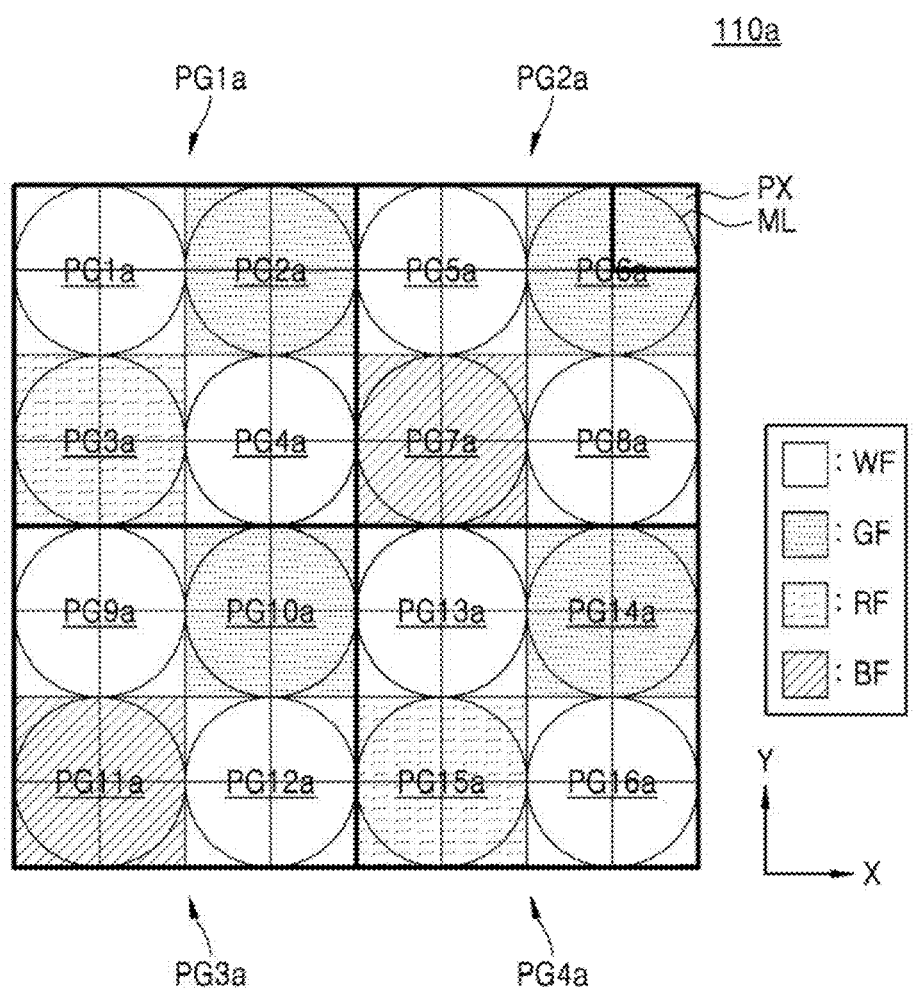

FIGS. 3 and 4 illustrate examples of a pixel array in an image sensor, according to some example embodiments, and show a portion of the pixel array 110 of FIG. 2.

Referring to FIG. 3, the pixel array 110 may include a plurality of pixel groups, e.g., first to sixteenth pixel groups PG1 to PG16. The first to sixteenth pixel groups PG1 to PG16 may be arranged in four pixel group rows and four pixel group columns (4×4).

Each of the first to sixteenth pixel groups PG1 to PG16 may include four pixels PX arranged in two rows and two columns (2×2). In addition, each of the first to sixteenth pixel groups PG1 to PG16 may include one microlens ML on four pixels PX such that the microlens ML at least partially overlaps the four pixels PX.

According to a shape and a refractive index of a microlens ML, a pixel signal generated by each of four pixels PX included in one pixel group on which one microlens ML is disposed may vary. That is, phases of pixel signals generated by four pixels PX included in one pixel group may be different from each other. Therefore, an image sensor (e.g., 100 of FIGS. 1 and 2) or an image processing apparatus (e.g., 200 of FIG. 1) according to the inventive concepts may perform an auto focusing (AF) function by using the pixel signals. When the image sensor 100 or the image processing apparatus 200 performs an imaging function of capturing an image without performing the AF function, a high-quality image may be provided by correcting a phase difference of each of pixel signals generated by four pixels PX included in one pixel group.

The pixel array 110 may include color filters to sense (e.g., selectively transmit) various colors. Each of the first to sixteenth pixel groups PG1 to PG16 may include one of a green color filter GF, a red color filter RF, or a blue color filter BF. In some example embodiments, an arrangement ratio of the red color filter RF, the green color filter GF, and the blue color filter BF in the pixel array 110 (e.g., a ratio of respective areas of the red color filter RF, the green color filter GF, and the blue color filter BF in the pixel array 110) may be 1:2:1.

In some example embodiments, four adjacent pixel groups among a plurality of pixel groups (e.g., the first to sixteenth pixel groups PG1 to PG16) included in the pixel array 110 may include the same color filters. The first to sixteenth pixel groups PG1 to PG16 may include color filters to form a Bayer pattern. For example, the first to fourth pixel groups PG1 to PG4 and the thirteenth to sixteenth pixel groups PG13 to PG16 may include the green color filter GF, the fifth to eighth pixel groups PG5 to PG8 may include the red color filter RF, and the ninth to twelfth pixel groups PG9 to PG12 may include the blue color filter BF. However, the inventive concepts are not limited thereto, and each of the first to sixteenth pixel groups PG1 to PG16 may include at least one of a white color filter, a yellow color filter, a cyan color filter, and a magenta color filter.

Referring to FIG. 4, a pixel array 110*a* may include first to sixteenth pixel groups PG1*a* to PG16*a* each including four pixels PX arranged by 2×2 and one microlens ML on the four pixels PX.

Each of the first to sixteenth pixel groups PG1*a* to PG16*a* may include one of a white color filter WF, the green color filter GF, the red color filter RF, and the blue color filter BF. The white color filter WF may transmit therethrough all of red color light, blue color light, and green color light. In some example embodiments, an arrangement ratio of the red color filter RF, the green color filter GF, the blue color filter BF, and the white color filter WF in the pixel array 110*a* may be 1:2:1:4.

For example, the first, fourth, fifth, eighth, ninth, twelfth, thirteenth, and sixteenth pixel groups PG1*a*, PG4*a*, PG5*a*, PG8*a*, PG9*a*, PG12*a*, PG13*a*, and PG16*a* may include the white color filter WF. In addition, for example, the second, sixth, tenth, and fourteenth pixel groups may include the green color filter GF, the third and fifteenth pixel groups PG3*a* and PG15*a* may include the red color filter RF, and the seventh and eleventh pixel groups PG7*a* and PG11*a* may include the blue color filter BF. However, the inventive concepts are not limited thereto, and each of the first to sixteenth pixel groups PG1*a* to PG16*a* may include a yellow color filter instead of the white color filter WF, and for example, the yellow color filter may be arranged at a position where the white color filter WF is arranged.

Figure 5A:
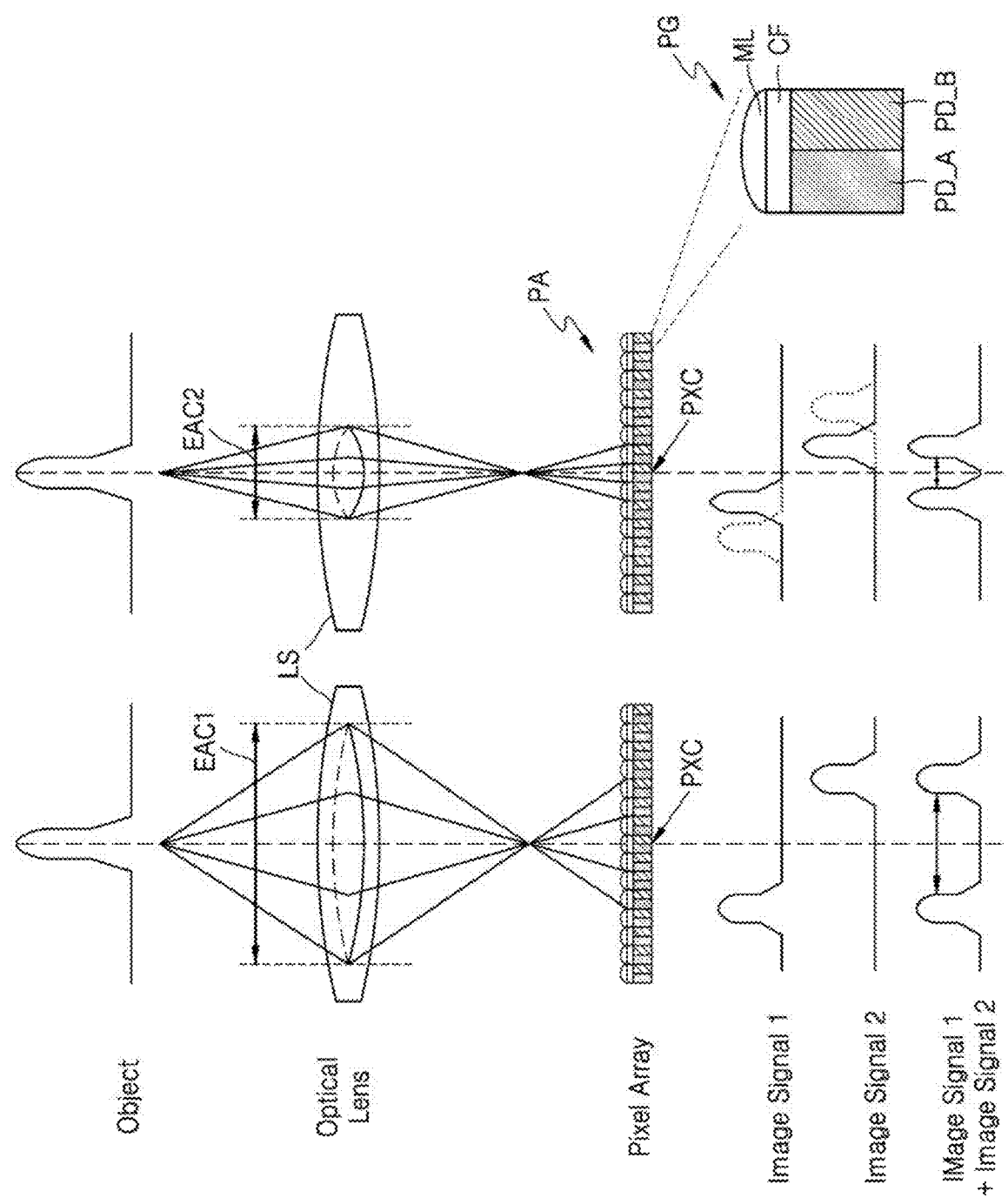
FIGS. 5A and 5B illustrate an effective aperture size change in an optical lens and a change in an image signal according to the effective aperture size change according to some example embodiments.
Figure 5B:
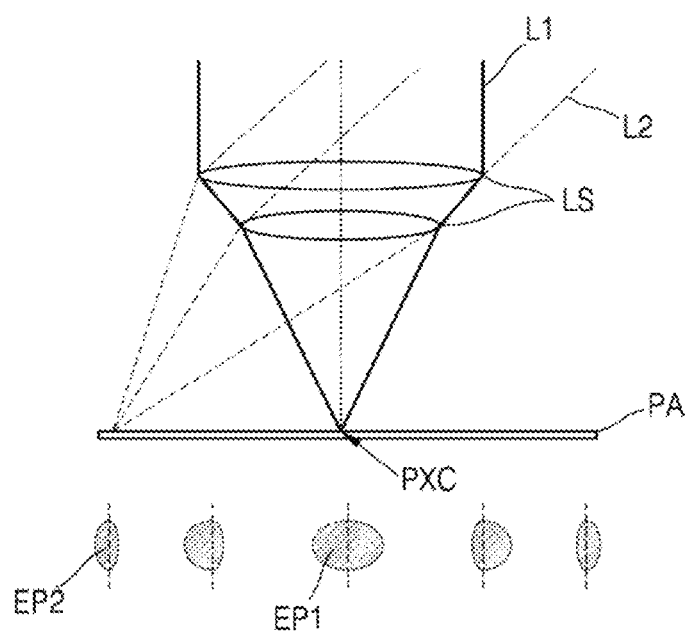

FIGS. 5A and 5B illustrate an effective aperture size change in an optical lens and a change in an image signal according to the effective aperture size change according to some example embodiments.

Referring to FIG. 5A, light reflected from an object may pass through the optical lens LS in an image processing system (e.g., 10 of FIG. 1). The light having passed through the optical lens LS may be incident to a pixel array PA of an image sensor (e.g., pixel array 110 of image sensor 100).

A pixel group PG may include a first pixel and a second pixel adjacent to each other. A color filter CF and the microlens ML may be on the first pixel and the second pixel. A first image signal may be generated by a first photodiode area PD_A of the first pixel, and a second image signal may be generated by a second photodiode area PD_B of the second pixel. A distance between a peak of the first image signal and a peak of the second image signal may occur due to shapes of the optical lens LS and the microlens ML, and also, a difference between a magnitude of the first image signal and a magnitude of the second image signal may vary.

In some example embodiments, the greater an effective aperture size of the optical lens LS, the greater a deviation between the first image signal and the second image signal. For example, because a first effective aperture size EAC1 is greater than a second effective aperture size EAC2, a deviation between the first image signal and the second image signal, which corresponds to the first effective aperture size EAC1, may be greater than a deviation between the first image signal and the second image signal, which corresponds to the second effective aperture size EAC2.

Referring to FIGS. 5A and 5B, the size of an exit pupil may gradually decrease outward from the center PXC of the pixel array PA. In some example embodiments, the center PXC of the pixel array PA corresponds to the center and/or central axis of an optical lens LS, microlens, etc. at least partially overlapping the pixels of the pixel array PA, such that the position of a pixel of the pixel array in relation to the center PXC of the pixel array PA is the position of the pixel in relation to a central axis that is the central axis of the optical lens LS or microlens at least partially overlapping the pixel array PA. For example, first light L1 may be incident to the center of the pixel array PA, and second light L2 may be incident to an edge of the pixel array PA. The size of a first exit pupil EP1 at the center PXC of the pixel array PA may be greater than the size of a second exit pupil EP2 at the edge of the pixel array PA. The greater the size of an exit pupil, the greater an effective aperture size. Therefore, a pixel farther from the center PXC of the pixel array PA may have a less effective aperture size of the optical lens LS than a pixel closer to the center PXC of the pixel array PA due to a shape difference of an exit pupil of the optical lens LS. An image sensor according to the inventive concepts may correct image data according to the first image signal and image data according to the second image signal, based on position information of (e.g., position information associated with) a pixel in the pixel array PA, including for example information indicating a position of the pixel in relation to the center PXC of the pixel array PA, a radial field from the center PXC of the pixel array PA to the pixel, etc., by considering an effective aperture size, which varies depending on a position of a pixel in the pixel array PA.

Figure 6:
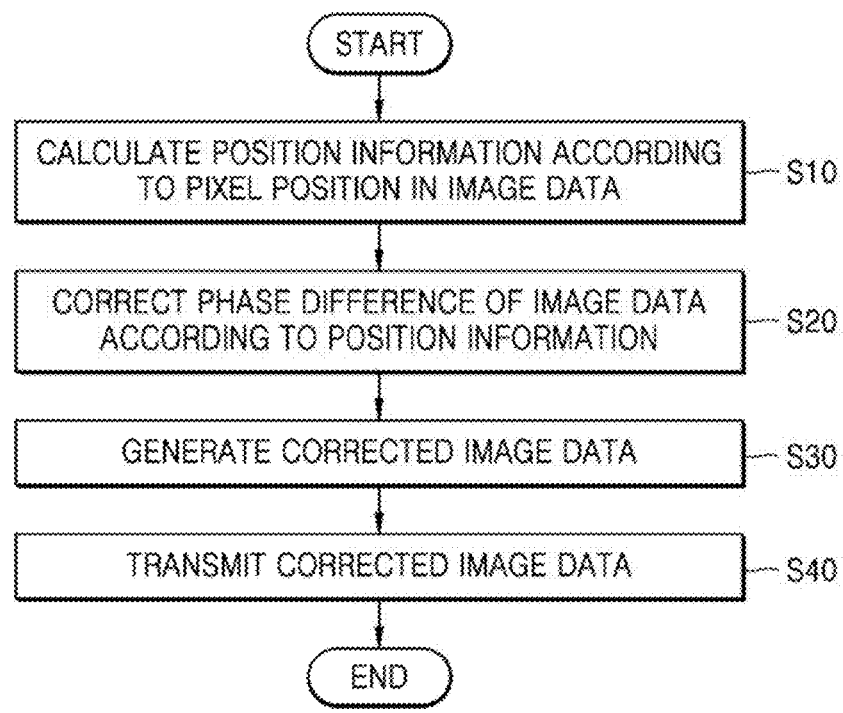
FIGS. 6 and 7 are flowcharts illustrating an image processing method according to some example embodiments.
Figure 7:
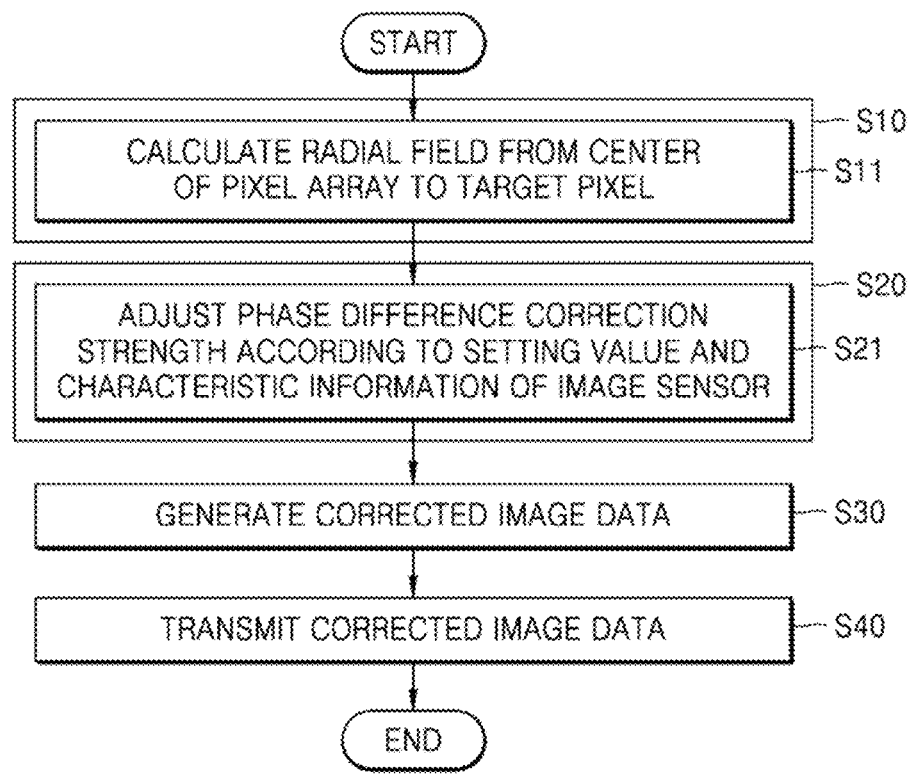
Figure 8:
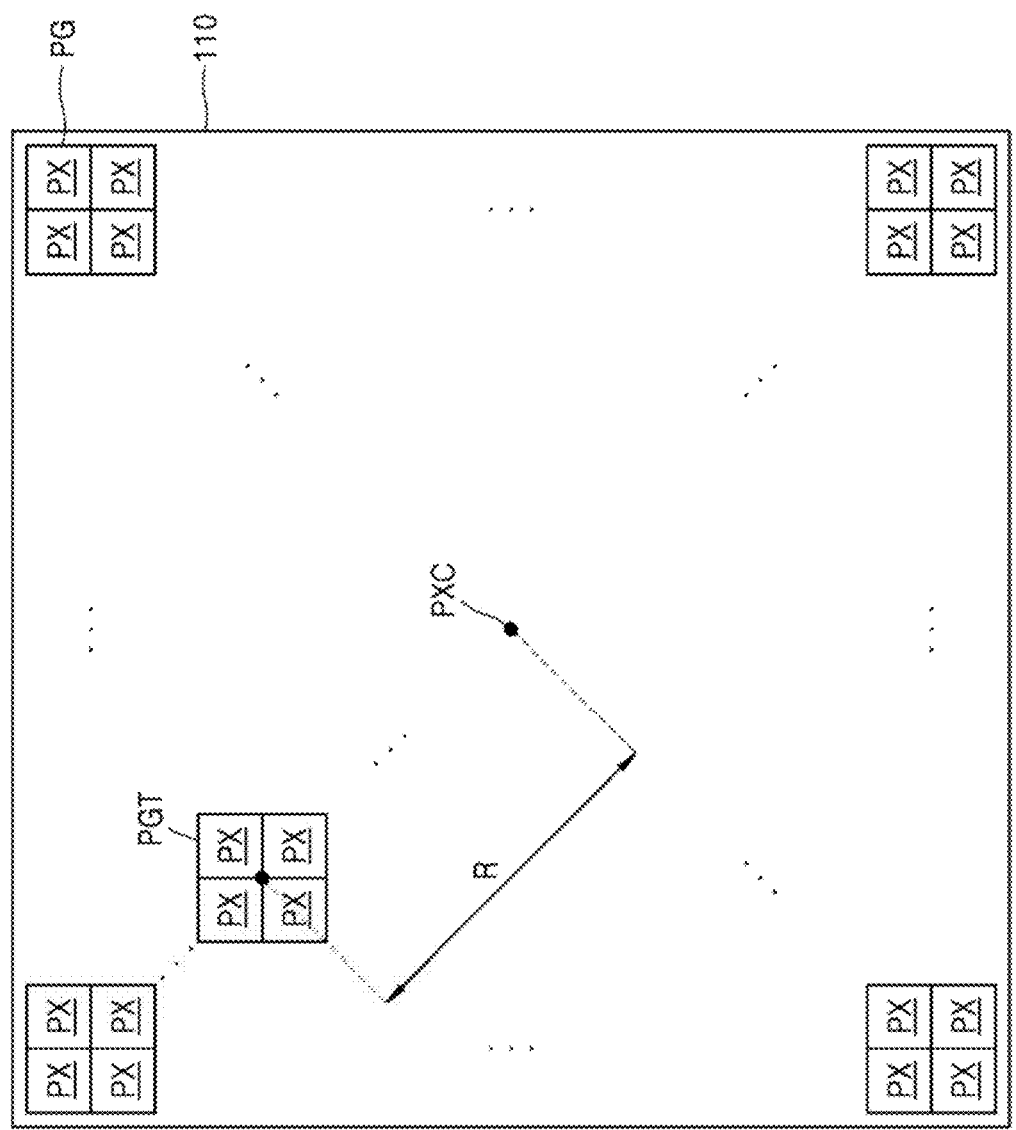
FIG. 8 illustrates a method of calculating position information according to some example embodiments.

FIGS. 6 and 7 are flowcharts illustrating an image processing method according to some example embodiments. FIG. 8 illustrates a method of calculating position information according to some example embodiments. Operations described below may be performed by the signal processor 210 in the image processing apparatus 200 of FIG. 1 or by the signal processor 130 in the image sensor 100 of FIG. 2.

Referring to FIG. 6, in operation S10, position information according to (e.g., position information associated with, indicating, etc.) a pixel position in image data may be calculated. The position information may be information about (e.g., associated with, indicating, etc.) a position of a corresponding pixel in a pixel array, which may be understood to be the corresponding pixel of the pixel array which generates a pixel signal which the image data is at least partially based upon. Such position information may include information indicating, for a given image data, a position of the corresponding pixel in the pixel array with regard to the center of the pixel array, such as a distance, radial field, etc. from the center of the pixel array to the corresponding pixel in the pixel array. In some example embodiments, the image data may be data according to the arrangement of the color filters described with reference to FIG. 3 or 4. Because an effective aperture size of an optical lens (e.g., LS of FIG. 1) may vary depending on a position of a corresponding pixel in the pixel array (e.g., a position of the corresponding pixel in relation to the center of the pixel array), pixel information according to a pixel position may be calculated to consider an effective aperture effect.

In some example embodiments, in operation S10, a pre-processing operation on the image data may be performed, and then, position information according to a pixel position in pre-processed image data may be calculated. The pre-processing operation may be performed to facilitate calculation of position information (e.g., to calculate position information according to pixel positions corresponding to pixels of the pixel array in the image data), for example to increase the accuracy of the calculation of the position information or increase a calculation speed of the position information.

In operation S20, a phase difference of the image data may be corrected according to the calculated position information, which may be performed to correct the image data and thus to generate corrected image data based on the corrected phase difference of the image data at operation S30. For example, due to the shape and the refractive index of a microlens on a plurality of pixels included in a pixel group, pixel signals respectively generated by the plurality of pixels may be different from each other, that is, phases of the pixel signals respectively generated by the plurality of pixels may be different from each other, for example based on the different positions of the pixels in the pixel array which may be different positions of the pixels in relation to a center of the pixel array which may be a position of the pixel in relation to a central axis of the microlens.

In some example embodiments, the size of an exit pupil of the optical lens may vary depending on a position of a pixel in the pixel array (e.g., a position of the pixel in relation to a center of the pixel array which may be a position of the pixel in relation to a central axis of the optical lens, and thus, a phase difference between pixel signals of pixels included in a pixel group may vary depending on position information according to pixel positions corresponding to pixels of the pixel array which correspond to the pixels of the image data. For example, a phase difference of image data (e.g., phase difference associated with the pixels of the image data) may be corrected according to the calculated position information (e.g., position information corresponding to pixels of the pixel array which correspond to the pixels of the image data) so that the greater an effective aperture size of the optical lens, the greater a correction strength.

In some example embodiments, a correction operation may be performed in a direction of reducing the phase difference according to the position information. For example, by applying an image smoothing filter to a region in which a phase difference is large, the phase difference in at least the region may be reduced using a blurring effect.

In operation S40, the corrected image data that is generated at S30 may be transmitted, for example to a display interface such as a touchscreen display to be displayed, for example to a remote device via a network communication link, for example to a memory to be stored therein.

In some example embodiments, after (e.g., subsequently to performing) operation S20, an operation of separating a plurality of pieces of phase data from the corrected image data and generating a plurality of pieces of color data through a re-mosaic operation may be performed. The operation after operation S20 is described below with reference to FIG. 10.

Referring to FIGS. 6 to 8, operation S10 may include operation S11. In operation S11, a radial field R (e.g., radial distance) from a center PXC of the pixel array 110 (which may be a location in the pixel array 110 intersected by a central axis of an optical lens, microlens, etc.) to a target pixel PGT may be calculated. For example, a radial field R from the center PXC of the pixel array 110 to a target pixel group PGT including the target pixel may be calculated. The shape of an exit pupil at the target pixel may be estimated from the radial field.

The radial field R of the target pixel group PGT may have a direction from the center PXC of the pixel array 110 to a center of the target pixel group PGT and have a magnitude corresponding to a distance from the center PXC of the pixel array 110 to the center of the target pixel group PGT. Each of a plurality of pixel groups PG included in the pixel array 110 may be the target pixel group PGT, and operation S11 may be performed on all of the plurality of pixel groups PG. However, example embodiments of the image processing method according to the inventive concepts are not limited thereto, and the radial field R of each of pixels PX from the center PXC of the pixel array 110 may be calculated.

Operation S20 may include operation S21. In operation S21, a phase difference correction strength may be adjusted according to a setting value and characteristic information of (e.g., associated with) an image sensor. A characteristic (e.g., characteristic information) of the image sensor (or a characteristic of a camera module including the image sensor) may include, for example, information indicating an inclined degree between an optical lens (e.g., LS of FIG. 1) and the image sensor, information indicating (e.g., associated with) a structural characteristic of the image sensor, or the like. That is, the characteristic of the image sensor may indicate a unique characteristic (e.g., structural characteristic) of the image sensor.

In some example embodiments, the setting value may be a weight applied to each of the characteristic information and position information of the image sensor to correct a phase difference. That is, a phase difference correction strength corresponding to the radial field R may be adjusted according to the setting value.

In some example embodiments, an operation of previously setting the setting value as a user parameter may be further included. For example, the setting value may be set according to a user parameter setting signal (e.g., S_PS of FIG. 9), and the phase difference correction strength may be adjusted based on the set setting value. That is, a phase difference correction strength according to a length of the radial field R may be adjusted according to the setting value.

The image processing method according to the inventive concepts may correct a phase difference between pixels PX sharing a microlens according to a pixel position at which a pixel PX is located in the pixel array 110. Therefore, an image sensor, an image processing apparatus, and an image processing method according to the inventive concepts may provide a high-quality image by removing an artifact pattern caused by an effective aperture size of an optical lens.

Figure 9:
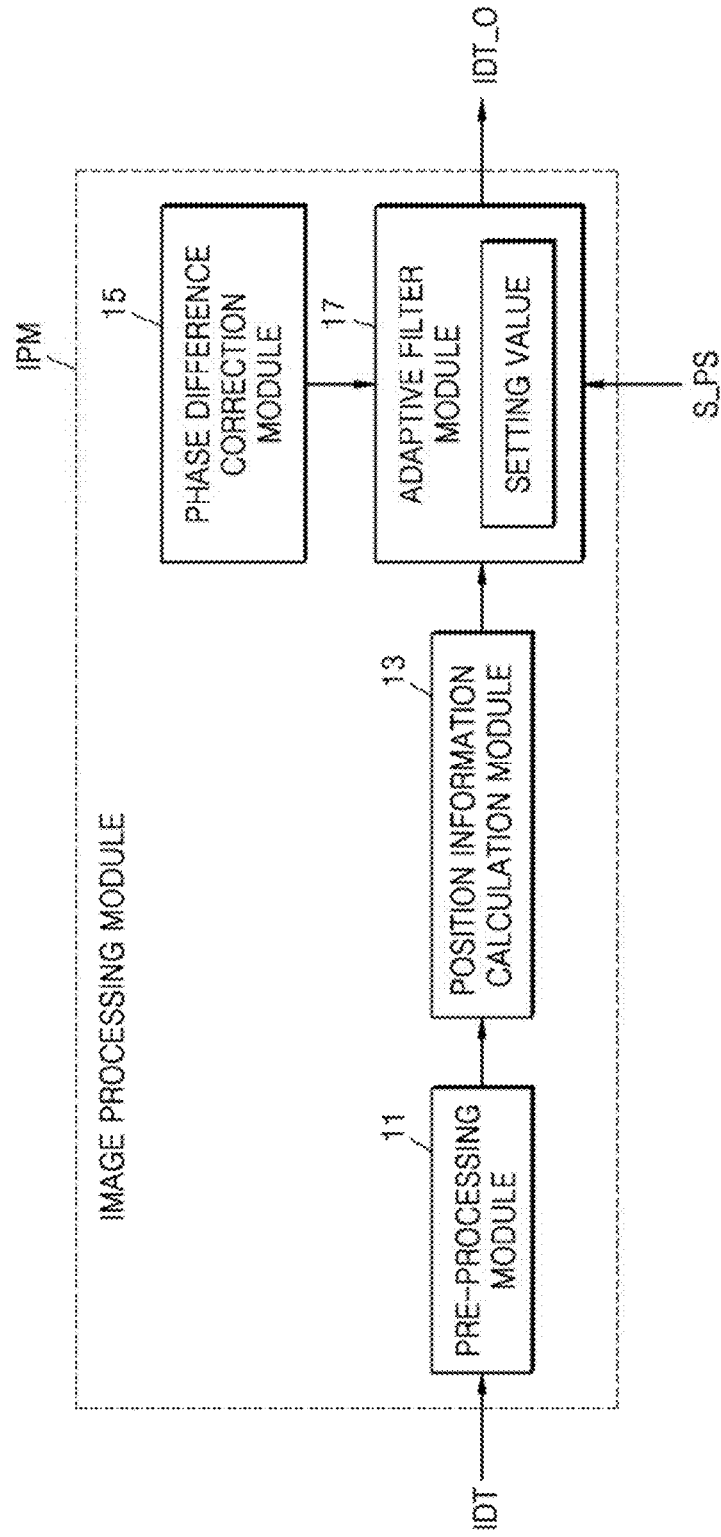
FIG. 9 is a block diagram illustrating an image processing module according to some example embodiments.

FIG. 9 is a block diagram illustrating an image processing module according to some example embodiments. An image processing module IPM of FIG. 9 may be included in the signal processor 210 in the image processing apparatus 200 of FIG. 1 or included in the signal processor 130 in the image sensor 100 of FIG. 2. It will be understood that a signal processor, including the signal processor 210 in the image processing apparatus 200 of FIG. 1 and/or the signal processor 130 in the image sensor 100 of FIG. 2, may be configured to implement the image processing module IPM or any portion thereof, and thus implement the functionality of the image processing module IPM or any portion thereof, for example based on the signal processor including processing circuitry configured to implement the module or any portion thereof, for example based on the processing circuitry including a memory storing a program of instructions and a processor configured to execute the program of instructions to implement the module or any portion thereof.

Referring to FIG. 9, the image processing module IPM may receive the image data IDT, perform a phase difference correction operation according to position information, and generate corrected image data IDT_O. For example, the image data IDT may be generated by the pixel array 110 described with reference to FIG. 3 or by the pixel array 110a described with reference to FIG. 4. That is, the image data IDT may be generated by a pixel array including pixel groups each including four pixels sharing a microlens.

The image processing module IPM may include a pre-processing module 11, a position information calculation module 13, a phase difference correction module 15, and an adaptive filter module 17. A configuration of each of the image processing module IPM and the modules described below may be implemented by a software block executed by a certain processor, or a combination of an exclusive hardware block and a processing unit.

The pre-processing module 11 may perform a pre-processing operation on the image data IDT to facilitate a data processing operation of other modules. For example, the pre-processing module 11 may perform the pre-processing operation, such as crosstalk correction, a despeckle operation, ADLC, defective pixel correction, and lens shading correction, on the image data IDT. The pre-processed image data may be provided to the position information calculation module 13. However, unlike shown in FIG. 9, the position information calculation module 13 may directly receive the image data IDT.

The position information calculation module 13 may calculate position information from the pre-processed image data or the image data IDT. The position information may be information about (e.g., information associated with, information indicating, etc.) a position of a pixel in a pixel array (e.g., a pixel in the pixel array which corresponds to at least a portion of the image data, for example to a pixel signal). In some example embodiments, the position information may be a radial field from a center of the pixel array to a pixel group including a particular pixel, or in some example embodiments, the position information may be a radial field from the center of the pixel array to the particular pixel.

The phase difference correction module 15 may generate characteristic information of an image sensor (or a camera module including the image sensor). For example, the characteristic information may be information about a structural characteristic of the image sensor (or the camera module), such as an inclined degree between an optical lens (e.g., LS of FIG. 1) and the image sensor. That is, the characteristic information of the image sensor may be information about a unique characteristic of the image sensor.

The phase difference correction module 15 may perform an operation of estimating the characteristic of the image sensor or the camera module from an image capturing operation of obtaining image data by a particular number of times (e.g., at least once) and generate the characteristic information. For example, the phase difference correction module 15 may receive an AF operation performing result from the outside (e.g., an application processor) and generate the characteristic information of the image sensor based on the AF operation performing result.

The adaptive filter module 17 may perform a filtering operation of correcting a phase difference of the pre-processed image data or the image data IDT by using the characteristic information calculated by the phase difference correction module 15 and the position information calculated by the position information calculation module 13. For example, the adaptive filter module 17 may increase a phase difference correction strength for data generated from a pixel relatively close to the center (e.g., PXC of FIG. 8) of the pixel array more than for data generated from a pixel relatively far from the center PXC of the pixel array.

The adaptive filter module 17 may adjust the phase difference correction strength based on a setting value set according to a user parameter setting signal S_PS. That is, the adaptive filter module 17 may adjust, according to the setting value, a difference between a phase difference correction strength for data generated from a pixel relatively far from the center PXC of the pixel array and a phase difference correction strength for data generated from a pixel relatively close to the center PXC of the pixel array.

In addition, the adaptive filter module 17 may change, according to the setting value, a weight to be applied to each of the characteristic information and the position information. Therefore, the adaptive filter module 17 may apply a larger weight to the characteristic information than the position information or apply a larger weight to the position information than the characteristic information, according to the setting value.

Figure 10:
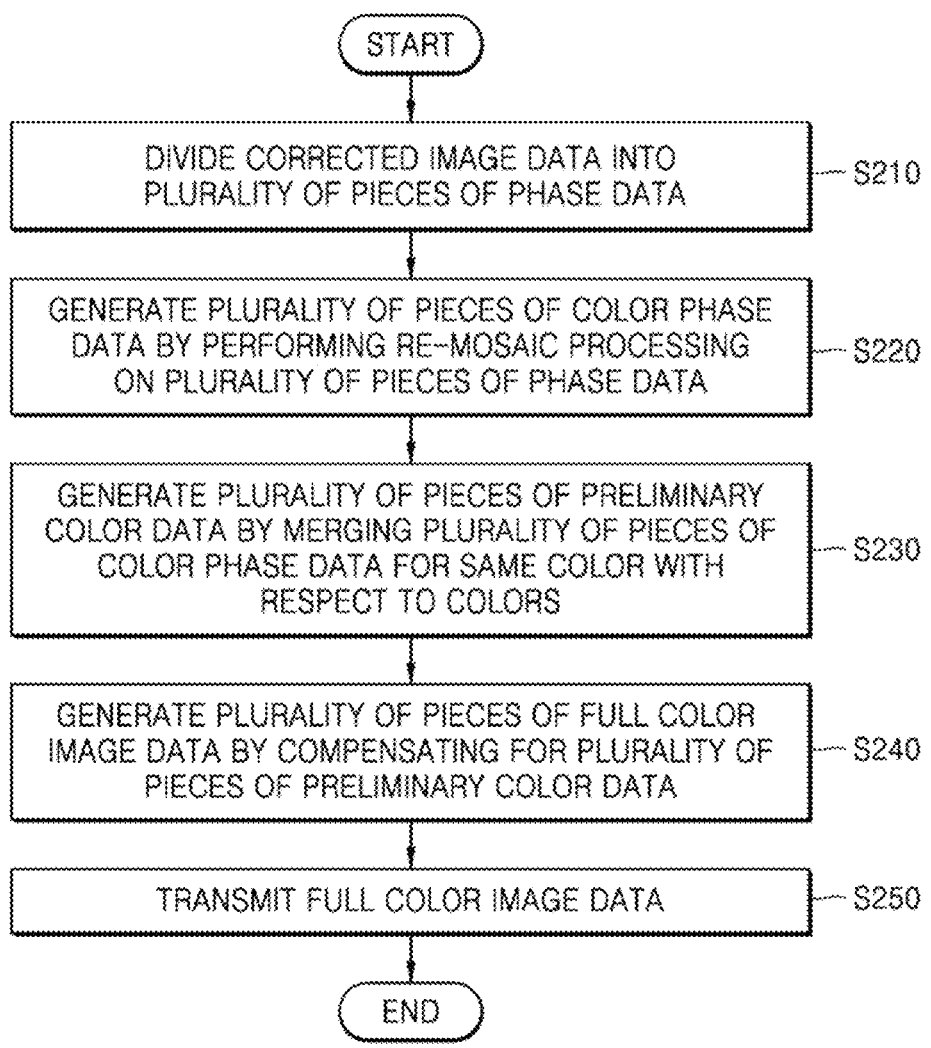
FIG. 10 is a flowchart illustrating an image processing method according to some example embodiments.

FIG. 10 is a flowchart illustrating an image processing method according to some example embodiments. Operations described below may be performed by the signal processor 210 in the image processing apparatus 200 of FIG. 1 or by the signal processor 130 in the image sensor 100 of FIG. 2. In some example embodiments, operations S210 to S240 may be performed after (e.g., subsequently to performing) operation S20 of FIG. 6 and are operations of generating a plurality of pieces of full color image data according to respective colors from image data including various pieces of color information. Operations S210 to S240 may be performed by modules other than the modules described with reference to FIG. 9. However, according to some example embodiments, operation S240 may not be performed.

Referring to FIG. 10, in operation S210, corrected image data (e.g., IDT_O of FIG. 9) may be divided into a plurality of pieces of phase data. In some example embodiments, corrected image data of a 2n×2n-arranged pattern (n being any positive integer) may be sampled as a plurality of pieces of phase data each having an n×n-arranged pattern. For example, image data generated by the pixel array 110 or 110a described with reference to FIG. 3 or 4 may be generated by pixel signals generated from a pixel group including the same color information and different phases.

In operation S210, the plurality of pieces of phase data may be generated by sampling the corrected image data according to phases. Image data generated from different pixels included in one pixel group may be divided into different pieces of phase data. For example, as described with reference to FIGS. 3 and 4, when one pixel group includes four pixels, first to fourth pieces of phase data may be generated in operation S210.

In operation S220, a plurality of pieces of color phase data may be generated by respectively performing re-mosaic processing on the plurality of pieces of phase data, which may include performing re-mosaic processing on separate, respective pieces of phase data of the plurality of pieces of phase data. For example, a plurality of pieces of red color phase data including information about (e.g., associated with) a red color and respectively including pieces of information about different phases, a plurality of pieces of green color phase data including information about a green color and respectively including pieces of information about different phases, and a plurality of pieces of blue color phase data including information about a blue color and respectively including pieces of information about different phases may be generated. In some example embodiments, for example, the plurality of pieces of red color phase data, the plurality of pieces of green color phase data, the plurality of pieces of blue color phase data, and a plurality of pieces of white color phase data may be generated. In some example embodiments, the re-mosaic processing operation in operation S220 may include a general de-mosaic processing operation.

In operation S230, a plurality of pieces of preliminary color data may be generated by merging a plurality of pieces of color phase data for the same color with respect to colors. For example, a plurality of pieces of color phase data that are associated with a same particular color may be referred to as a plurality of pieces of particular color phase data, and a piece of preliminary color data may be generated by merging a plurality of pieces of particular color phase data that are associated with the same particular color. For example, red preliminary color data may be generated by merging the plurality of pieces of red color phase data, green preliminary color data may be generated by merging the plurality of pieces of green color phase data, and blue preliminary color data may be generated by merging the plurality of pieces of blue color phase data. In addition, white preliminary color data may be generated by merging the plurality of pieces of white color phase data.

In operation S240, a plurality of pieces of full color image data may be generated by compensating for the plurality of pieces of preliminary color data. Operation S240 is an operation of removing noise generated in the plurality of pieces of preliminary color data, that is, noise aliasing may occur in the plurality of pieces of preliminary color data by performing a sampling operation of dividing the corrected image data into the plurality of pieces of phase data in operation S210, and an operation of canceling the noise may be performed in operation S240.

In some example embodiments, in operation S240, each of the plurality of pieces of preliminary color data may be divided into a smooth image and a detail image, and an error may be removed from the divided detail image. The smooth image may indicate a signal of a relatively low frequency band, and the detail image may indicate a signal of a relatively high frequency band. The error may be removed by removing signals having a repeated pattern from the signal of the high frequency band in the detail image.

In addition, in operation S240, the error-removed detail image and the smooth image may be added to generate each of the plurality of pieces of full color image data. For example, red color data may be generated by dividing the red preliminary color data into a red smooth image and a red detail image, removing an error from the red detail image, and then adding the error-removed red detail image to the red smooth image. Blue color data, green color data, and the like may be generated in the same manner as the red color data.

The image processing method according to the inventive concepts may perform an operation of dividing image data into a plurality of pieces of phase data before a re-mosaic processing operation, thereby relatively simplifying the re-mosaic processing operation. Therefore, a latency due to the re-mosaic processing operation may be reduced, thereby reducing a time taken to generate full color image data.

In operation S250, the pieces of full color image data that is generated at S240 may be transmitted, for example transmitted as full color image data, for example transmitted to a display interface such as a touchscreen display to be displayed, for example transmitted to a remote device via a network communication link, for example transmitted to a memory to be stored therein.

Figure 11:
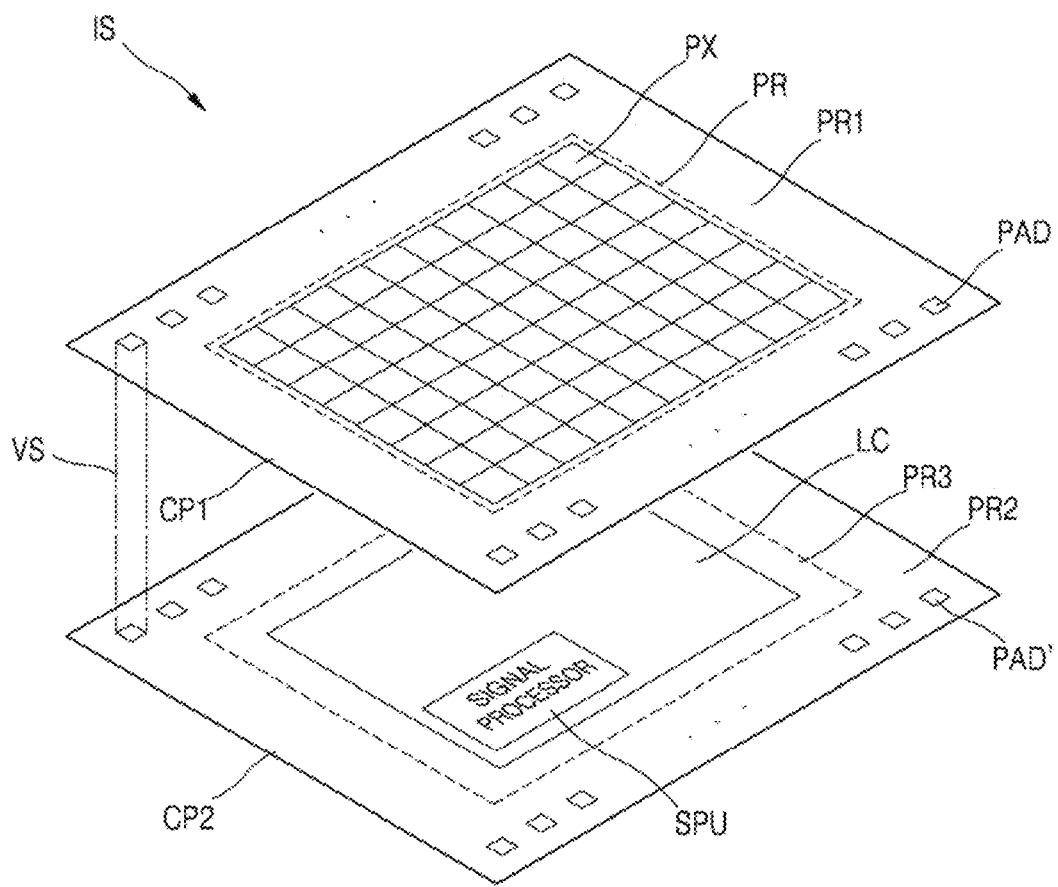
FIG. 11 is a schematic diagram of an image sensor according to some example embodiments.

FIG. 11 is a schematic diagram of an image sensor IS according to some example embodiments.

Referring to FIG. 11, the image sensor IS may be a stack-type image sensor including a first chip CP1 and a second chip CP2 stacked in a vertical direction. The image sensor IS may be implemented by the image sensor 100 described with reference to FIGS. 1 and 2.

The first chip CP1 may include a pixel region PR and an upper pad region PR1, and the second chip CP2 may include a peripheral circuit region PR3 and a lower pad region PR2. A pixel array in which a plurality of pixels PX are arranged may be formed in the pixel region PR and may include the pixel array 110 and/or the pixel array 110a described with reference to FIG. 3 and/or FIG. 4.

The peripheral circuit region PR3 in the second chip CP2 may include a logic circuit block LC and a plurality of transistors. The peripheral circuit region PR3 may provide a certain signal to each of the plurality of pixels PX included in the pixel region PR and read a pixel signal output from each of the plurality of pixels PX.

The logic circuit block LC may include a signal processor SPU. The signal processor SPU may correspond to the signal processor 130 of FIG. 2. The image sensor IS according to the inventive concepts may provide a high-quality image by removing an artifact pattern caused by an effective aperture size of an optical lens.

The lower pad region PR2 in the second chip CP2 may include a lower conductive pad PAD'. A plurality of lower conductive pads PAD' may be provided and respectively correspond to a plurality of upper conductive pads PAD. The lower conductive pad PAD' may be electrically connected to an upper conductive pad PAD in the first chip CP1 via a via structure VS.

Figure 12:
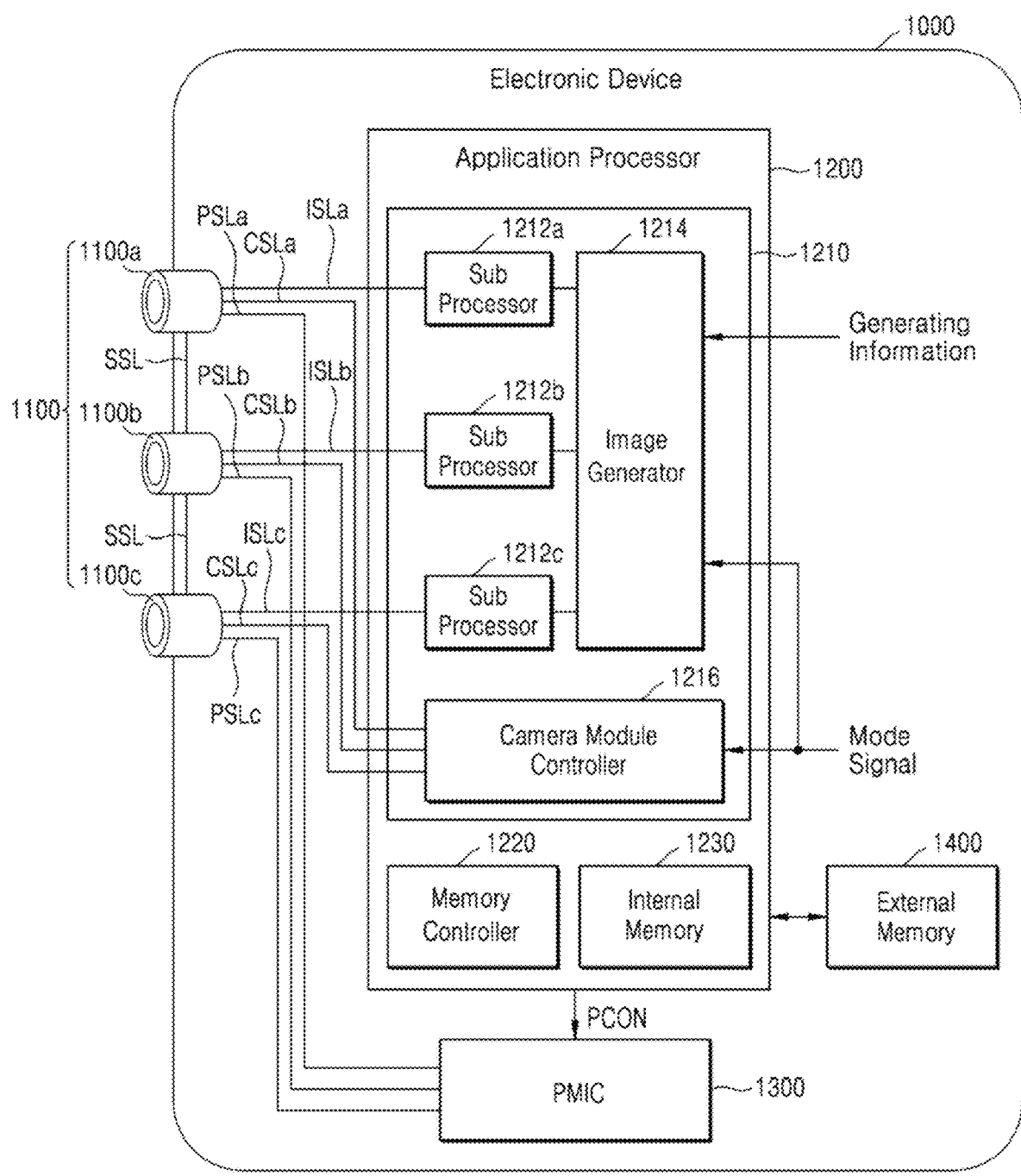
FIG. 12 is a block diagram of an electronic device including a multi-camera module according to some example embodiments.
Figure 13:
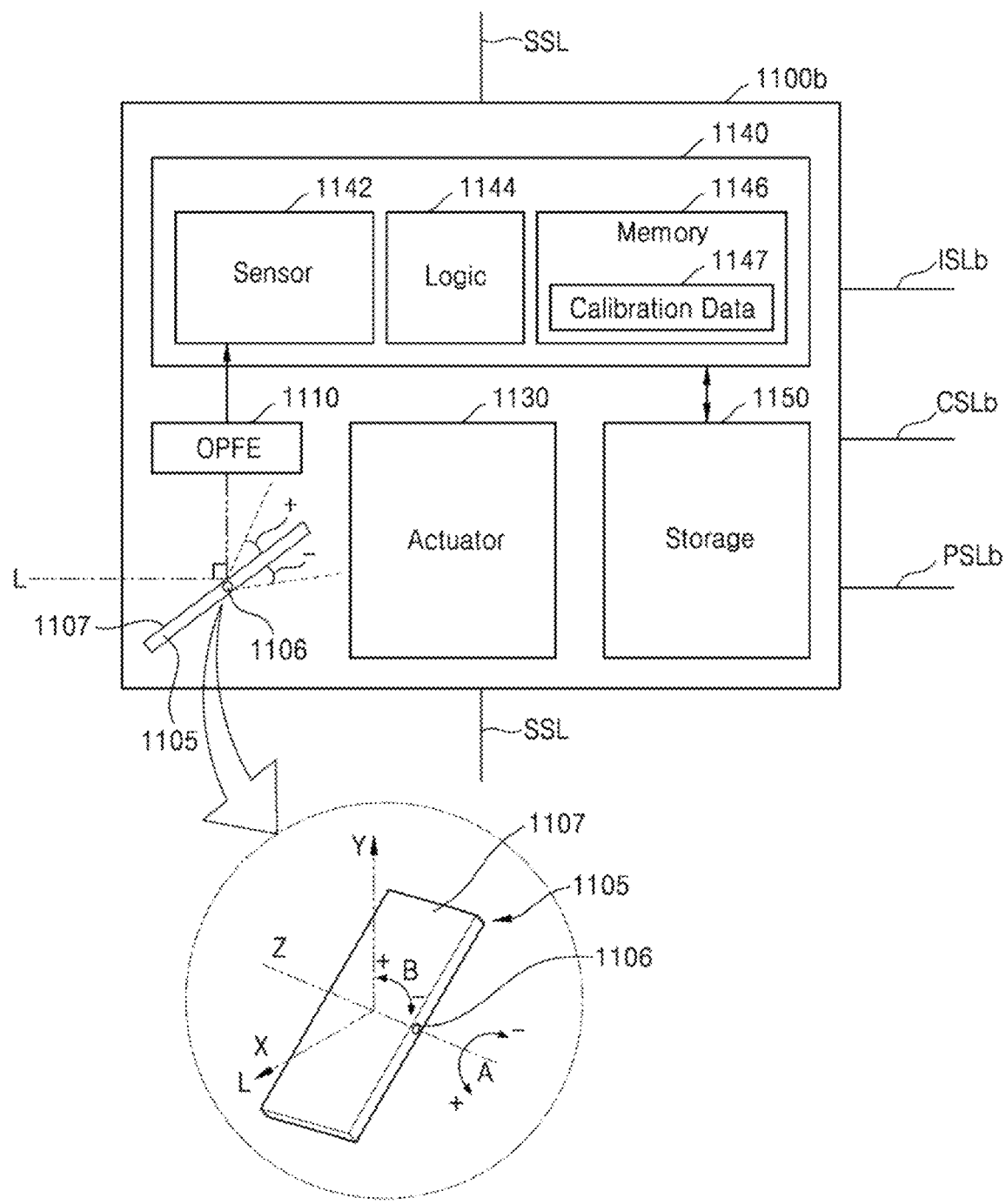
FIG. 13 is a detailed block diagram of a camera module of FIG. 12 according to some example embodiments.

FIG. 12 is a block diagram of an electronic device 1000 including a plurality of camera modules 1100a, 1100b, and 1100c according to some example embodiments. FIG. 13 is a detailed block diagram of the camera module 1100b of FIG. 12 according to some example embodiments. Although FIG. 13 illustrates a detailed configuration of the camera module 1100b, a description made below may also be applied to the other camera modules 1100a and 1100c.

Referring to FIG. 12, the electronic device 1000 may include a camera module group 1100, an application processor 1200, a power management integrated circuit (PMIC) 1300, and an external memory 1400. The camera module group 1100 may include the plurality of camera modules 1100a, 1100b, and 1100c. Although FIG. 12 shows an example in which three camera modules 1100a, 1100b, and 1100c are arranged, embodiments are not limited thereto.

Referring to FIGS. 12 and 13, the camera module 1100b may include a prism 1105, an optical path folding element (OPFE) 1110, an actuator 1130, an image sensing device 1140, and a storage 1150.

The prism 1105 includes a reflective surface 1107 of a light reflective material and may change a path of light L incident from the outside. The OPFE 1110 may include an optical lens including, for example, m groups (m is a natural number). The actuator 1130 may move the OPFE 1110 or the optical lens to a particular position.

In some example embodiments, the prism 1105 may change a path of the light L incident in a first direction X to a second direction Y that is perpendicular to the first direction X. In addition, the prism 1105 may rotate the reflective surface 1107 of the light reflective material in an A direction around a central axis 1106 or rotate the central axis 1106 in a B direction to change the path of the light L incident in the first direction X to the second direction Y. In some example embodiments, the OPFE 1110 may also move in a third direction Z that is perpendicular to the first direction X and the second direction Y.

The image sensing device 1140 may include an image sensor 1142, a control logic 1144, and a memory 1146 which may store calibration data 1147. The image sensor 1142 may sense an image to be sensed, by using the light L provided through the optical lens. In some example embodiments, the image sensor 1142 may be the image sensor 100 described with reference to FIG. 1 or 2 and may include at least one of the pixel arrays 110 and 110a described with reference to FIGS. 3 and 4. The image sensor 1142 may perform the image processing operation described with reference to FIGS. 6, 7, and 10.

In some example embodiments, each of the plurality of camera modules 1100a, 1100b, and 1100c included in the camera module group 1100 may individually perform the image processing operation described with reference to FIGS. 6, 7, and 10. Therefore, pieces of characteristic information of the plurality of camera modules 1100a, 1100b, and 1100c may be different from each other.

The control logic 1144 may control a general operation of the camera module 1100b. For example, the control logic 1144 may control an operation of the camera module 1100b in response to a control signal provided through a control signal line CSLb.

In some example embodiments, one camera module (e.g., 1100b) among the plurality of camera modules 1100a, 1100b, and 1100c may be a folded lens-type camera module including the prism 1105 and the OPFE 1110 described above, and the other camera modules (e.g., 1100a and 1100c) may be vertical-type camera modules in which the prism 1105 an the OPFE 1110 are not included, but embodiments are not limited thereto.

In some example embodiments, one camera module (e.g., 1100c) among the plurality of camera modules 1100a, 1100b, and 1100c may be a vertical-type depth camera configured to extract depth information by using, for example, an infrared ray (IR). In some example embodiments, the application processor 1200 may generate a three-dimensional (3D) depth image by merging an image data value provided from this depth camera with an image data value provided from another camera module (e.g., 1100a or 1100b).

In some example embodiments, at least two camera modules (e.g., 1100a and 1100b) among the plurality of camera modules 1100a, 1100b, and 1100c may have different fields of view. In some example embodiments, for example, optical lenses in the at least two camera modules (e.g., 1100a and 1100b) among the plurality of camera modules 1100a, 1100b, and 1100c may be different from each other but are not limited thereto.

In addition, in some example embodiments, fields of view of the plurality of camera modules 1100a, 1100b, and 1100c may be different from each other. In some example embodiments, optical lenses included in the plurality of camera modules 1100a, 1100b, and 1100c may also be different from each other but are not limited thereto.

In some example embodiments, the plurality of camera modules 1100a, 1100b, and 1100c may be physically separated from each other. That is, instead that a sensing area of one image sensor 1142 is divided and used by the plurality of camera modules 1100a, 1100b, and 1100c, an independent image sensor 1142 may be inside each of the plurality of camera modules 1100a, 1100b, and 1100c.

Referring back to FIG. 12, the application processor 1200 may include an image processing apparatus 1210, a memory controller 1220, and an internal memory 1230. The application processor 1200 may be implemented by being separated from the plurality of camera modules 1100a, 1100b, and 1100c. For example, the application processor 1200 and the plurality of camera modules 1100a, 1100b, and 1100c may be separately implemented by separate semiconductor chips.

The image processing apparatus 1210 may include a plurality of sub-image processors 1212a, 1212b, and 1212c, an image generator 1214, and a camera module controller 1216. In some example embodiments, the image processing apparatus 1210 may be the image processing apparatus 200 of FIG. 1 and perform the image processing operation described with reference to FIGS. 6, 7 and 10.

The image processing apparatus 1210 may include the plurality of sub-image processors 1212a, 1212b, and 1212c corresponding to the number of camera modules 1100a, 1100b, and 1100c.

Image data values generated from the plurality of camera modules 1100a, 1100b, and 1100c may be provided to corresponding sub-image processors 1212a, 1212b, and 1212c through separated image signal lines ISLa, ISLb, and ISLc, respectively. For example, the image data value generated by the camera module 1100a may be provided to the sub-image processor 1212a through the image signal line ISLa, the image data value generated by the camera module 1100b may be provided to the sub-image processor 1212b through the image signal line ISLb, and the image data value generated by the camera module 1100c may be provided to the sub-image processor 1212c through the image signal line ISLc. Transmission of these image data values may be performed by using, for example, a mobile industry processor interface (MIPI)-based camera serial interface (CSI), but embodiments are not limited thereto.

The image data values respectively provided to the plurality of sub-image processors 1212a, 1212b, and 1212c may be provided to the image generator 1214. The image generator 1214 may generate an output image by using respective image data provided from the plurality of sub-image processors 1212a, 1212b, and 1212c according to image generating information or a mode signal.

The camera module controller 1216 may provide a control signal to each of the plurality of camera modules 1100a, 1100b, and 1100c. The control signal generated from the camera module controller 1216 may be provided to the plurality of camera modules 1100a, 1100b, and 1100c respectively corresponding to separated control signal lines CSLa, CSLb, and CSLc.

The application processor 1200 may store the received image data values, in other words, encoded data, in the internal memory 1230 or the external memory 1400, and thereafter read and decode the encoded data from the internal memory 1230 or the external memory 1400 and display an image generated based on the decoded image data value. For example, a corresponding sub-processor among the plurality of sub-image processors 1212a, 1212b, and 1212c in the image processing apparatus 1210 may perform decoding and perform image processing on a decoded image data value.

The PMIC 1300 may supply power, e.g., a power source voltage, to the plurality of camera modules 1100a, 1100b, and 1100c through power signal lines PSLa, PSLb, and PSLc, respectively.

As described herein, any devices, electronic devices, modules, units, and/or portions thereof according to any of the example embodiments, and/or any portions thereof (including, without limitation, the image processing system 10, the image sensor 100, the pixel array 110, the controller 120, the signal processor 130, the row driver 140, the signal reader 150, the CDS 151, the ADC 153, the buffer 155, the ramp signal generator 157, the image processing apparatus 200, the signal processor 210, the image processing module IPM, the pre-processing module 11, the position information calculation module 13, the phase difference correction module 15, the adaptive filter module 17, the logic circuit module LC, the signal processor SPU, the electronic device 1000, the application processor 1200, the image generator 1214, sub-image processors 1212a, 1212b, 1212c, the camera module controller 1216, the memory controller 1220, the PMIC 1300, the external memory 1400, the internal memory 1230, the actuator 1130, the image sensing device 1140, the control logic 1144, the image sensor 1142, the memory 1146, the storage 1150, OPFE 1110, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, electronic devices, modules, units, and/or portions thereof according to any of the example embodiments.

Any of the memories described herein, including, without limitation, the internal memory 1230, the external memory 1400, the memory 1146, and/or the storage 1150 may be a non-transitory computer readable medium and may store a program of instructions. Any of the memories described herein may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

While the inventive concepts have been particularly shown and described with reference to some example embodiments thereof, it will be understood that various changes in form and details may be made therein without departing from the spirit and scope of the following claims.

What is claimed is:

1. An image processing method of processing image data generated by an image sensor, the image sensor including a pixel array, the image processing method comprising:
   calculating position information according to pixel positions in the image data, the pixel positions corresponding to pixels of the pixel array; and
   correcting a phase difference of the image data based on the position information,
   wherein the calculating the position information includes calculating a magnitude of a radial field from a center of the pixel array to a target pixel of the pixel array, and
   wherein the correcting the phase difference of the image data includes adjusting a phase difference correction strength based on the magnitude of the radial field according to a setting value and characteristic information associated with the image sensor.

2. The image processing method of claim 1, wherein the calculating the magnitude of the radial field from the center of the pixel array to the target pixel comprises calculating a separate magnitude of a separate radial field from the center of the pixel array to a target pixel group that includes the target pixel.

3. The image processing method of claim 1, wherein the characteristic information comprises information associated with a structural characteristic of the image sensor.

4. The image processing method of claim 1, further comprising setting the setting value in response to a user parameter setting signal.

5. The image processing method of claim 1, further comprising:
   dividing, into a plurality of pieces of phase data, corrected image data that is generated based on the correcting the phase difference;
   generating a plurality of pieces of color phase data based on performing re-mosaic processing on separate, respective pieces of phase data of the plurality of pieces of phase data;
   generating a plurality of pieces of preliminary color data based on merging a plurality of pieces of particular color phase data of the plurality of pieces of color phase data, the plurality of pieces of particular color phase data associated with a same particular color of a plurality of colors; and
   generating a plurality of pieces of full color image data based on compensating for the plurality of pieces of preliminary color data.

6. The image processing method of claim 1, wherein the pixel array comprises a plurality of pixel groups, each pixel group of the plurality of pixel groups comprising four pixels arranged in two adjacent rows and two adjacent columns, the each pixel group including a microlens such that the microlens of the each pixel group at least partially overlaps the four pixels of the each pixel group.

7. The image processing method of claim 6, wherein the each pixel group of the plurality of pixel groups comprises one corresponding color filter among a red color filter, a green color filter, a blue color filter, and a white color filter.

8. The image processing method of claim 1, wherein the adjusting the phase difference correction strength comprises changing both a weight to be applied to the characteristic information and a weight to be applied to the position information according to the setting value.

9. The image processing method of claim 8, wherein the weight applied to the characteristic information and the weight applied to the position information are different from each other.

10. An image sensor, comprising:
    a pixel array including a plurality of pixel groups, each pixel group of the plurality of pixel groups including a plurality of pixels; and
    a signal processor configured to
       calculating position information from image data generated by the pixel array, the position information including information associated with positions of the plurality of pixels in the pixel array;
       generating characteristic information; and
       correcting a phase difference of the image data to determine a corrected phase difference of the image data based on using the characteristic information and the position information to correct the image data, and generating corrected image data based on the corrected phase difference of the image data,
    wherein the signal processor is further configured to calculate the position information based on calculating a magnitude of a radial field from a center of the pixel array to a target pixel of the pixel array, and
    wherein the correcting the phase difference of the image data includes adjusting a phase difference correction strength based on the magnitude of the radial field according to a setting value and the characteristic information.

11. The image sensor of claim 10, wherein the signal processor is configured to
    pre-process the image data to generate pre-processed image data, and
    calculate the position information based on the pre-processed image data.

12. The image sensor of claim 10, wherein the each pixel group of the plurality of pixel groups comprises four pixels arranged in two adjacent rows and two adjacent columns, the each pixel group including a microlens such that the microlens of the each pixel group at least partially overlaps the four pixels of the each pixel group.

13. The image sensor of claim 12, wherein
    the each pixel group of the plurality of pixel groups comprises one corresponding color filter among a red color filter, a green color filter, and a blue color filter, and
    a ratio of respective areas of the red color filter, the green color filter, and the blue color filter in the pixel array is 1:2:1.

14. The image sensor of claim 12, wherein four adjacent pixel groups among the plurality of pixel groups included in the pixel array comprise a same color filter.

15. The image sensor of claim 12, wherein
    the each pixel group of the plurality of pixel groups comprises one corresponding color filter among a red color filter, a green color filter, a blue color filter, and a white color filter, and
    a ratio of respective areas of the red color filter, the green color filter, the blue color filter, and the white color filter in the pixel array is 1:2:1:4.

16. The image sensor of claim 10, wherein the signal processor is further configured to set the setting value according to a user parameter setting signal and adjust the phase difference correction strength according to the setting value.

17. An image processing apparatus that is configured to process image data that is output from an image sensor that includes a pixel array, the image processing apparatus comprising:

a memory storing a program of instructions; and a processor configured to execute the program of instructions to process the image data based on
- calculating position information from the image data, wherein the position information is information associated with positions of pixels in the pixel array;
- generating characteristic information associated with the image sensor; and
- correcting a phase difference of the image data based on using the characteristic information and the position information, wherein the processor is configured to execute the program of instructions to calculate the position information based on calculating a magnitude of a radial field from a center of the pixel array to a target pixel of the pixel array, and wherein the correcting the phase difference of the image data includes adjusting a phase difference correction strength based on the magnitude of the radial field according to a setting value and the characteristic information.

18. The image processing apparatus of claim 17, wherein the processor is configured to execute the program of instructions to pre-process the image data to generate pre-processed image data and calculate the position information based on the pre-processed image data.

* * * * *